(12) United States Patent
Schnitzler

(10) Patent No.: US 10,146,039 B2
(45) Date of Patent: Dec. 4, 2018

(54) IMAGE CAPTURE METHOD FOR A MICROSCOPE SYSTEM, AND CORRESPONDING MICROSCOPE SYSTEM

(71) Applicant: Leica Microsystems (Schweiz) AG, Heerbrugg (CH)

(72) Inventor: Harald Schnitzler, Lüchingen (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 159 days.

(21) Appl. No.: 14/902,120

(22) PCT Filed: Jul. 3, 2014

(86) PCT No.: PCT/EP2014/064154
§ 371 (c)(1),
(2) Date: Dec. 30, 2015

(87) PCT Pub. No.: WO2015/001007
PCT Pub. Date: Jan. 8, 2015

(65) Prior Publication Data
US 2016/0291302 A1    Oct. 6, 2016

(30) Foreign Application Priority Data

Jul. 4, 2013 (DE) .................. 10 2013 213 091

(51) Int. Cl.
*G02B 21/18* (2006.01)
*G02B 21/00* (2006.01)
(Continued)

(52) U.S. Cl.
CPC ......... *G02B 21/008* (2013.01); *G02B 21/006* (2013.01); *G02B 21/0044* (2013.01);
(Continued)

(58) Field of Classification Search
CPC .... G02B 21/008; G02B 21/006; G02B 21/22; G02B 27/0075; B02B 21/0044; H04N 13/0007
See application file for complete search history.

(56) References Cited

U.S. PATENT DOCUMENTS 5,603,687 A    2/1997   Hori et al.
6,445,415 B1   9/2002   Olsson
(Continued)

FOREIGN PATENT DOCUMENTS

CN    1975504 A    6/2007
CN    102982522    3/2013
(Continued)

*Primary Examiner* — Christopher G Findley
(74) *Attorney, Agent, or Firm* — Hodgson Russ LLP

(57) ABSTRACT

A method (200) is proposed for furnishing a digital resulting image, using a microscope system (1) that comprises means (R, L, 41) for furnishing microscopic images at different numerical apertures as well as a digital image capture unit (50). The method encompasses: capturing by means of the digital image capture unit (50), in the form of digital individual images, at least two microscopic images at different numerical apertures; and comparing respective mutually corresponding image regions of the digital individual images to one another in terms of their image sharpness, the image regions of the digital individual images having the greatest image sharpness being in each case combined to yield the digital resulting image.

14 Claims, 5 Drawing Sheets

(51) Int. Cl.
*H04N 13/106* (2018.01)
*G02B 27/00* (2006.01)
*G02B 21/22* (2006.01)

(52) U.S. Cl.
CPC ......... *G02B 21/22* (2013.01); *G02B 27/0075* (2013.01); *H04N 13/106* (2018.05)

(56) References Cited

U.S. PATENT DOCUMENTS

| | | |
|---|---|---|
| 7,583,434 B2 | 9/2009 | Zimmer |
| 7,991,209 B2 | 8/2011 | Tuempner |
| 8,879,072 B2 | 11/2014 | Langholz et al. |
| 2007/0047072 A1 | 3/2007 | Zimmer |
| 2007/0047073 A1* | 3/2007 | Zimmer ................ G02B 21/22 |
| | | 359/377 |
| 2012/0189293 A1 | 7/2012 | Cao et al. |
| 2013/0016885 A1 | 1/2013 | Tsujimoto |
| 2015/0181197 A1* | 6/2015 | Baldwin ............ H04N 13/0011 |
| | | 348/47 |

FOREIGN PATENT DOCUMENTS

| | | |
|---|---|---|
| DE | 3831481 A1 | 5/1989 |
| DE | 202008004271 U1 | 5/2008 |
| JP | 2003344779 | 12/2003 |
| JP | 2005215693 | 8/2005 |
| JP | 2009524842 | 7/2009 |
| JP | 2012173391 | 9/2012 |
| JP | 2013020212 | 1/2013 |

\* cited by examiner

IMAGE CAPTURE METHOD FOR A MICROSCOPE SYSTEM, AND CORRESPONDING MICROSCOPE SYSTEM

CROSS-REFERENCE TO RELATED APPLICATIONS

The present application is the U.S. national phase of International Application No. PCT/EP2014/064154 filed Jul. 3, 2014, which claims priority of German Application No. 10 2013 213 091.0 filed Jul. 4, 2013, the entirety of which is incorporated herein by reference.

FIELD OF THE INVENTION

The present invention relates to a method for image capture using a microscope system that comprises means for furnishing microscopic images at different numerical apertures, and to a microscope system.

BACKGROUND OF THE INVENTION

Known microscopes, for example stereomicroscopes having optical zooms, are often configured with means for physically limiting the ray bundle and thus for setting the pupil diameter or numerical aperture. Fixed or variable aperture diaphragms, e.g. iris diaphragms or LCD diaphragms, and/or suitable beam limiters on lenses and lens mounts, can be provided, for example, for this purpose.

The present invention relates both to microscopes in which the numerical aperture of one or more optical channels is variably adjustable by means of suitable aperture diaphragms, and to microscopes that comprise two or more separate optical channels each having a fixed aperture diaphragm. Both cases relate to microscope systems that comprise means for furnishing microscopic images at different numerical apertures.

The numerical aperture determines three essential parameters of an optical image, namely the resolution, brightness, and depth of field.

The maximum resolution capability of a microscope in the focal plane of the objective is limited by light diffraction, which in turn is determined by the numerical aperture of the imaging system. The maximum resolution capability R, indicated in line pairs per millimeter (LP/mm), is proportional to the numerical aperture nA. In simplified fashion, $R=3000 \times nA$. High resolution therefore requires a high numerical aperture.

At the same time, however, depth of field—i.e. the sharpness of object regions located outside the focal plane—is also important when viewing objects that are not entirely flat. For geometric reasons, this decreases with increasing numerical aperture and is inversely proportional to numerical aperture. For visual examination, the depth of field (DOF) is described by the empirical Berek formula, according to which $DOF=\lambda/(2 \times nA^2)+0.34/(M_{tot} \times nA)$, where $\lambda$ is the wavelength of the light and $M_{tot}$ the total visual magnification. The wavelength $\lambda$ and depth of field DOF are indicated, for example, in mm. A high degree of sharpness in image regions above or below the focal plane is accordingly achieved with decreased numerical apertures.

The captured light cone determines the brightness I. In simplified fashion, $I=c \times nA^2$, where c represents a constant. High image brightness is thus once again achieved with a high numerical aperture. With digital image capture in particular, however, image brightness can be flexibly adjusted and adapted by way of not only the numerical aperture but also the exposure time, electrical gain, optical filters, or digital post-processing. These adaptations are known to one skilled in the art and will therefore not be explained further.

With conventional microscopes, however, conflicting aims exist at least with regard to resolution and depth of field.

DE 10 2006 036 300 B4 and DE 10 2006 036 768 B4 disclose stereomicroscopes, respectively of the telescope and Greenough type, which present to the observer an image pair whose individual images are resolved with different quality (hereinafter also referred to as "asymmetrical" stereomicroscopes). One of the individual images has a higher numerical aperture and therefore a higher resolution in the focal plane, while the other individual image, having a lower numerical aperture, offers better depth of field. These images are received simultaneously by the observer's two eyes. The image pairs are assembled by the brain in such a way that the observer perceives the respectively better resolved detail from the two images. A physiological phenomenon in the context of image fusion in the human brain is thus exploited.

Digital image acquisition devices do not perform this image fusion, and utilize only one image acquired at fixed aperture. They usually capture exactly one image, based on one beam geometry and the resolution and depth of field defined thereby. The sharpness regions of images acquired by such digital image acquisition devices, i.e. the regions in which a corresponding object is sharply imaged, are therefore considerably more narrowly delimited. As compared with a visual stereoscopic image impression through a stereomicroscope, this is not satisfactory. The disadvantage of digital images as compared with visual observations is moreover compounded by the ability of the human eye to accommodate by up to +/-5 diopters.

The existing art in conventional wide field microscopes (not having stereoscopic beam paths) addresses these problems by so-called "Z stacking," in which the focus position of the microscope is shifted in steps during acquisition of an image sequence. This requires, however, either moving the specimen stage that has the object, or moving the microscope with respect to the object. In either case a considerable mass must be moved (microscope on Z drive, or specimen stage), which makes the operation complex in terms of both apparatus and time. The time outlay in turn prevents implementation as a live image, which is disadvantageous especially in the context of a movement by the user in an X, Y, and Z direction, and for the observation of living cells.

In addition, under (normally) non-telecentric image acquisition conditions, the image scale of the object changes as the focus position changes. The images acquired by Z stacking therefore do not superimpose exactly onto one another because of the variation in image scale, and must be adapted to one another by correlation or by compression or expansion. This operation involves uncertainties and possible errors in the image to be assembled.

The object of the invention, especially in view of the strong trend toward digital microscopy that is apparent nowadays, is to overcome the aforementioned disadvantages and to enable improved image capture.

DISCLOSURE OF THE INVENTION

In light of the above, the invention proposes a method for furnishing a digital resulting image using a microscope system that comprises means for furnishing microscopic images at different numerical apertures as well as a digital image capture unit; and a microscope system having the features of the independent claims. Preferred embodiments are the subject matter of the respective dependent claims and of the description that follows.

SUMMARY AND ADVANTAGES OF THE INVENTION

The invention relates to the acquisition and combination of microscopic images, having different resolutions and depths of field, that are furnished at different numerical apertures. The invention thus enables detection of very fine structures, as well as a topographic description of an object, with the greatest possible quality and little outlay.

The invention provides overall a method for furnishing a digital resulting image utilizing a microscope system, the microscope system comprising means for furnishing microscopic images at different numerical apertures as well as a digital image capture unit. The method encompasses: capturing, by means of the digital image capture unit, at least two microscopic images at different numerical apertures, in the form of digital individual images; and comparing mutually corresponding image regions of the digital individual images to one another in terms of their image sharpness. In each case, the image regions having the greatest image sharpness are combined to yield the digital resulting image. Because of the preparation according to the present invention this image has greater image sharpness, in a larger number of image regions, than each of the digital individual images from which the image regions were selected. It thus possesses greater overall sharpness than the digital individual images, and advantageously combines the sharpest regions of the digital individual images.

As already discussed, the "means for furnishing microscopic images at different numerical apertures" can be, for example, one or more optical channels, for example stereo channels of a stereomicroscope, in each of which the numerical aperture is variably settable by means of suitable aperture diaphragms. Microscopes that comprise two or more separate optical channels each having a fixed aperture diaphragm, or having no aperture diaphragms but having different numerical apertures, therefore also possess means for furnishing microscopic images having different numerical apertures.

In contrast to known methods, by means of the present invention it is possible to generate improved resulting images whose information content goes considerably beyond that of simple (individual-image) sequences, and which can nevertheless be obtained with reduced outlay. In contrast to the methods of the existing art recited above, the present invention is also suitable in particular for use in "single-channel" microscopes or for image capture via only one channel of a stereomicroscope, if at least one adjustable aperture diaphragm is respectively provided here. With the present invention, high-quality resulting images can therefore be generated with comparatively little outlay in terms of equipment.

In particular, as compared with the Z stacking known in microscopy and explained previously, no appreciable masses need to be moved in the context of the present invention. The invention provides at most, in the least favorable case, for adjustment of an aperture diaphragm between the acquisition of different digital individual images. Even this is not necessary if a two-channel acquisition is possible using different numerical apertures in the individual channels, so that in this case no parts at all of the microscope need to be moved.

The "at least two microscopic images," which are obtained with an adjustable aperture diaphragm and are captured by means of the digital image capture unit in the form of the corresponding digital individual images, can also be referred to as a "diaphragm series." A useful number for the "at least two" digital individual images is based on the particular microscope parameters that are set, for example the magnification used, which in turn defines the depth of field. For example, two, four, six, eight, 10, 15, or 20 individual images can be acquired. A further parameter here that determines the number of digital individual images to be acquired is the number of settable diaphragm openings, i.e. the positions of a positioning device of a corresponding aperture diaphragm and the diaphragm openings that can thereby be effected.

Provision is thus made according to the present invention to digitally acquire at least two individual images that are furnished at different numerical apertures, and to combine them into one digital resulting image. Digital image acquisition is accomplished, for example, with a CCD chip of a camera or with a linear sensor. The invention can also encompass, for example, acquiring digital individual images repeatedly at one diaphragm setting or repeatedly in one channel having a fixed numerical aperture. An improvement in resolution can thereby be achieved, for example, since noise effects of the image sensor being used are decreased. At least two of the individual images are, however, furnished at different numerical apertures so that, as explained below in more detail with reference to the attached FIG. 3, the advantages both of high resolution at high numerical aperture and of great depth of field at low numerical aperture can be combined.

The invention also offers advantages, in particular, as compared with the high dynamic range (HDR) method known from photography, in which multiple acquired images are assembled into a "super-image" having an enhanced range of brightness and contrast. HDR methods, however, affect only local image exposure, not image sharpness. HDR methods can nevertheless also be used in the context of the present invention, with the result that additional image information can be obtained.

In photography, the selected aperture produces a depth of field that is used merely as a creative means. The optical conditions in microscopy are fundamentally different from those in photography, however, since sharpness in photography is not limited by diffraction. In photography, closing down the aperture therefore does not signify a decrease in resolution at the focal plane, as is to be observed in microscopy. In photography, conversely, an increase in depth of field is achieved with largely constant resolution in the focal plane. The problem of decreased resolution therefore does not occur in photography. To obtain maximum resolution and depth of field in photography it is therefore necessary merely to close down a diaphragm sufficiently. Photographic and microscopic beam paths, and capabilities for image acquisition and image processing, are fundamentally different, and are subject to different physical laws, limitations, and requirements.

As mentioned, creation of the microscope's resulting image encompasses selecting, on the basis of a comparison of their image sharpness, the different image regions that are used for assembly of the resulting image. Local contrast values or other values characterizing image sharpness, for example, can be respectively used for this purpose. This can also involve, for example, a numerical score that indicates an image contrast or image sharpness in an image region of a digital individual image. Because a comparison between the digital individual images is performed, this score can be expressed as a percentage or as a relative value (with reference, for example, to the first correspondingly investigated digital individual image or to the one having the greatest image sharpness). The method according to the present invention can thus be carried out very rapidly by means of known image processing algorithms, which can be implemented e.g. in the image capture device itself and/or in a control computer that applies control thereto.

The aforesaid comparison can be supplemented with further method steps. For example, the digital individual images can also be examined by means of suitable image evaluation methods, corresponding values that characterize the image sharpness being respectively determined for the image regions or the entire individual image. If these values exceed a minimum specified value, for example, or if they reach a magnitude presentable on a display system, then usefully no further comparison is made. The result is to save processing time in the context of dynamic image display.

A corresponding method can be carried out particularly quickly if the mutually corresponding image regions are defined on the basis of a specified location in the at least two digitally captured individual images. For example, each of the digital individual images can be subdivided identically into arbitrary pixel blocks, for example having 5×5, 10×10, 50×50, or 100×100 pixels (or corresponding non-square pixel blocks). Each pixel block corresponds to an image region, and can be compared with a corresponding image region of another individual image. A specification can be also be made, for example, in the form of image coordinates and/or pixel regions. Comparison therefore does not require any image evaluation beforehand, and corresponding methods can therefore execute very quickly.

It can also be advantageous to subject the individual images to an image content detection operation and to ascertain on that basis the mutually corresponding image regions. For investigation of three-dimensional structures against a flat background, for example, such as a digital component or a biological structure, an image content detection operation can be performed by means of which the digital component or biological structure is detected as an image region. This corresponds to a known image segmentation. No comparison is performed in regions, for example the flat background, that are "uninteresting" for the respective investigative purpose; this saves further processing time. Correspondingly detected image contents can of course also be examined, as explained above, in the form of pixel blocks.

Two or more individual images that have been furnished at different numerical apertures are thus combined by means of electronic image processing to yield a new digital resulting image having optimized local sharpness. For example, the image region of the individual images can be scanned as a whole, and for respective small local regions the best-resolved image element can be determined and its image information can be transferred into the resulting image.

If pixel blocks are defined, as indicated above, in the form of a grid, their respective size, i.e. the size of the mutually corresponding image regions, can be made dependent on various factors that relate both to the image itself and to the performance parameters of the image acquisition device used, of the bus system, of the displaying monitor, and/or of an evaluating control computer. Individual preselection, by a user and/or on the basis of an expected resolution, can be respectively possible. The method can be adapted, for example, to display on a digital image display unit, the size of the respective image regions being selected so that the displayable resolution of the image display unit is not exceeded and unnecessary computing power is therefore not consumed. Corresponding limitations can, however, also already be taken into consideration in the context of the acquisition of the digital individual images and their resolution.

Adaptation of the corresponding screen ruling is based substantially on the object texture and its topography: with pronounced topographies and edges a smaller screen ruling can be used, and for weak textures or image noise, a larger screen ruling. This as well is encompassed by the use, as explained, of an image content detection operation, which is incorporated in order to ascertain the mutually corresponding image regions of the digital individual images. A screen ruling of this kind can therefore also be applied nonuniformly over the image field of the digital individual images (but identically in all the digital individual images). The borders of the screen edges that are obtained can be respectively adapted by interpolation upon assembly of the image regions of the individual images, so that a homogeneous transition is produced.

The invention makes it possible in particular to achieve a serious increase in sharpness in the resulting image that is obtained, with no need to make assumptions about the object and thereby run the risk of artifacts, as with other digital post-processing operations (e.g. with known edge sharpening). Because the image obtained is made up only of a synthesis of generic acquired images (possibly in fact from the same channel), the resulting images obtained by means of the method according to the present invention can be assumed to have an unrestricted "truth content" with, at most, minimal artifacts.

The ascertaining of the sharpness value or of a variable characterizing image sharpness can encompass, for example, determining a respective sharpness value or resolution value by means of a contrast-based method. If information regarding image contents is available, it is also possible for only a part of the image which is of interest to be subjected to a corresponding method.

It can be particularly advantageous additionally to modify a focus setting of a main objective of the microscope system upon acquisition of the at least two individual images. The method according to the present invention is thus also suitable in combination with a conventional Z stacking method. One image per Z plane can be acquired, but it is particularly advantageous to carry out the method respectively in different Z planes, so that sharpness-optimized resulting images are obtained for the respective different Z planes. These can in turn be converted into a further sharpness-optimized image. This yields a further improvement as compared with known Z stacking methods, since the respective maximally achievable resolution (with the aperture diaphragm open) is retained.

The means for furnishing the microscopic images at different numerical apertures can be embodied, for example, as separate stereo channels in stereomicroscopes. Multiple digital individual images of the object can be acquired at the different numerical apertures in the two stereo channels by means of a respective capture module of the image capture unit, by respectively adjusting a variable aperture diaphragm. Correspondingly improved partial images are thus obtained for each stereo channel. In other words, a respective digital resulting image can be created from the individual images, but separately for the two stereo channels. This makes it possible also to correspondingly improve stereoscopic images that are suitable, for example, for viewing by means of a stereoscopic viewing unit.

Provision can also be made, however, to use an "asymmetrical" stereomicroscope, explained above, having two stereo channels having different numerical apertures. One individual image of a respective stereo channel can be combined here with one individual image of the respective other stereo channel. Capture of the images in the stereo channels can occur simultaneously.

It is thus possible to use entirely separate imaging systems, which capture the same object region possibly from different perspective angles, as means for furnishing microscopic images at different numerical apertures. Microscope systems of the telescope or Greenough type (i.e. stereomicroscopes) are accordingly appropriate as typical utilization forms for such parallel imaging operations.

In a method according to the present invention, the at least two microscopic individual images furnished at the different numerical apertures can thus be acquired simultaneously in the form of the two digital individual images, at least two acquisition channels being used. One image capture module of the image capture unit, for example a chip in a respective chip housing, can be associated with each of the two channels. Instead of the use of two entirely separate imaging systems, however, one imaging beam path can also be divided into multiple channels that are directed to different image capture modules.

With simultaneous image acquisition it is also possible in particular to image moving objects with high dynamics, although the method is more complex in terms of equipment than a sequential method in which the at least two individual images furnished at the different numerical apertures are acquired successively. With sequential acquisition, advantageously a diaphragm opening is adjusted between the at least two imaging operations. This can be accomplished completely automatically, for example by means of control signals of a corresponding control unit, for example a control computer.

The aperture diaphragm that can be used can be embodied, for example, as an iris diaphragm or as an electronically controllable LCD transmission element.

An image capture unit for a microscope system having means for furnishing microscopic images at different numerical apertures, which is configured to carry out a method according to one of the preceding claims, is likewise a subject of the present invention. Reference may be made to the aspects explained above regarding the features and advantages of the image capture unit according to the present invention.

A microscope system having means for furnishing microscopic images at different numerical apertures, and a corresponding image capture unit, also profit from the features explained above.

Advantageously, in a microscope system of this kind a control device is provided, by means of which control can be applied to the image capture unit in such a way that it acquires at least two digital individual images that are each furnished at different numerical apertures. A control device of this kind can also be configured, for example, to adjust an adjustable aperture diaphragm.

Advantageously, a respective number of digital individual images to be acquired, and (if provided for) at least one adjustment magnitude for the aperture diaphragm, are specifiable by means of the control device. The control device is furthermore configured to apply control to the image acquisition unit in such a way that an acquisition of the digital individual images, and an adjustment of the aperture diaphragm by an amount equal to the adjustment magnitude, are alternatingly executable. A corresponding control unit can also be embodied to adapt the exposure time or the gain of the digital image capture unit to the respectively selected aperture modification, thereby ensuring that the brightness of the acquired image is the same at the different numerical apertures.

The microscope system according to the present invention is embodied in particular, as mentioned, as a stereomicroscope having at least two stereo channels, one capture module of the image capture unit being associated with each of the stereo channels.

The invention is illustrated by comparison with the existing art in the drawings on the basis of exemplifying embodiments, and will be described in detail with reference to the drawings.

DESCRIPTION OF THE FIGURES

In the Figures, mutually corresponding elements bear identical reference characters and, in the interest of clarity, are not explained repeatedly.

DETAILED DESCRIPTION AND EMBODIMENTS OF THE INVENTION

Figure 1:
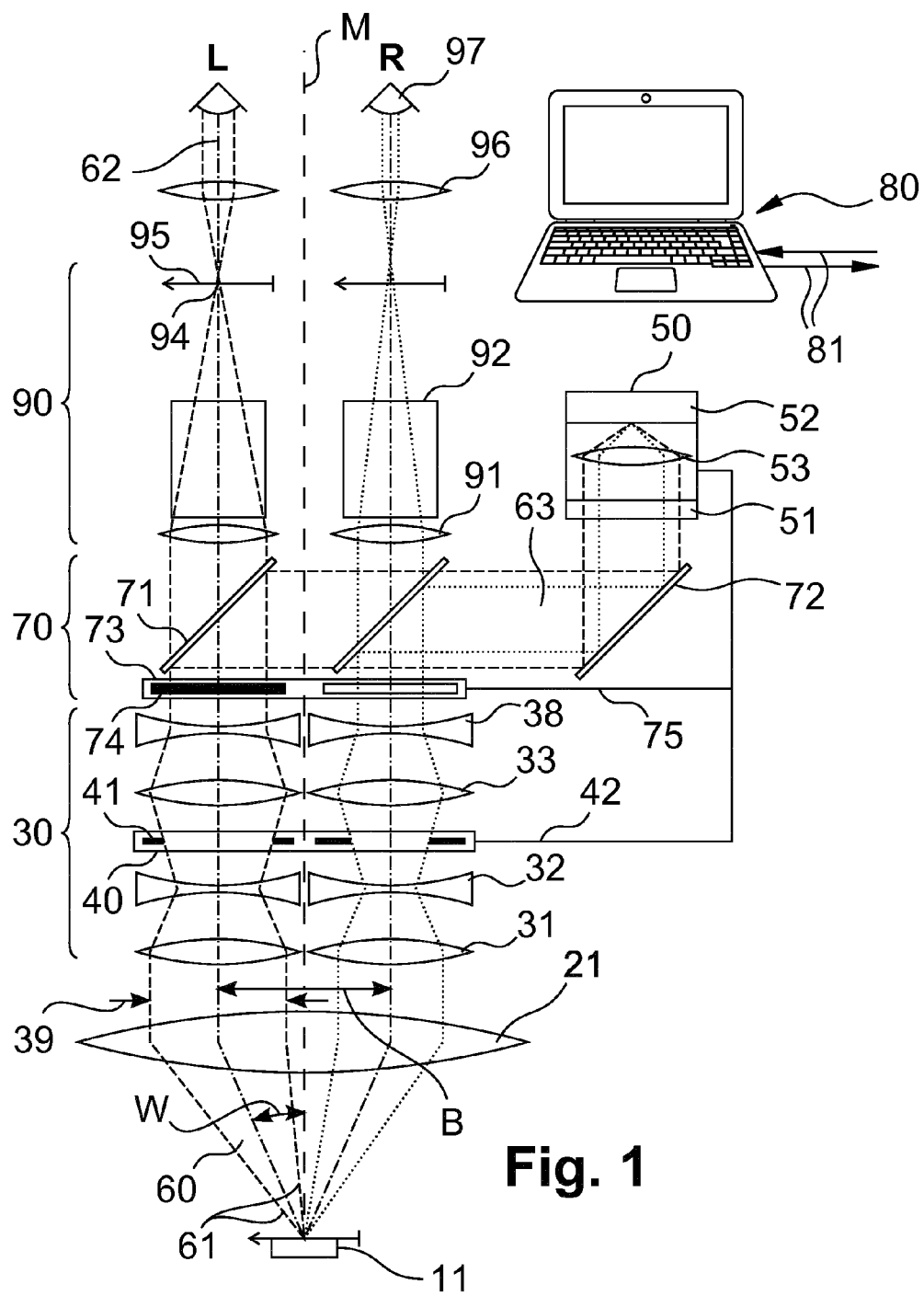
FIG. 1 is a schematic sketch of the beam paths of the stereo channels of a stereomicroscope in which image capture in accordance with an embodiment of the invention can be performed.

Image capture in accordance with an embodiment of the present invention can be accomplished, for example, via one or both stereo channels of a stereomicroscope of the telescope type. The components of a stereomicroscope of this kind, having the elements additionally provided in accordance with an embodiment of the invention, are schematically depicted in FIG. 1.

Corresponding stereomicroscopes comprise, for example, a common main objective 21 followed by two identically embodied stereoscopic channels L and R. An object 11 to be viewed is arranged in a plane of focus of the main objective. The stereomicroscope depicted in FIG. 1 is constructed symmetrically, which means that the stereomicroscope comprises two stereo channels L, R that physically correspond to one another. The elements of left stereo channel L or the elements of right stereo channel R are thus alternatively explained in FIG. 1. The explanations relate, however, to both stereo channels L, R in identical fashion.

The invention is, however, also usable with particular advantage in stereomicroscopes in which one or more elements of the two stereo channels L and R are embodied differently from one another, for example as described in DE 10 2005 040 473 B4. The invention can also be utilized in stereomicroscopes of the Greenough type.

A corresponding stereomicroscope can therefore encompass, as means for furnishing microscopic images at different numerical apertures, two identically embodied stereo channels L and R having an individually or collectively adjustable aperture diaphragm (see below), or two stereo channels L and R embodied differently at least in terms of numerical aperture.

The beam paths of stereo channels L, R are respectively illustrated in FIG. 1 by a schematic depiction of marginal rays 61 of corresponding light bundles 60. Marginal rays 61 of left stereo channel L are depicted with dashed lines, those of right stereo channel R with dotted lines. The optical axes are respectively depicted with dot-dash lines and are labeled 62. A common center axis is labeled M.

Main objective 21 is followed by a zoom system 30 having four optical groups 31 to 33 and 38 in each of the two stereo channels L, R. Main objective 21 and the respective four optical groups 31 to 33 and 38 are depicted highly schematically, and in practice can, in particular, each encompass multiple optical lenses. The four optical groups 31 to 33 and 38 of the two stereo channels L, R can respectively be mechanically coupled to one another and, if movable (see below), can be displaced with common positioning means. Zoom systems 30 that can be utilized in the context of the present invention are described, for example, in U.S. Pat. No. 6,816,321 A.

The respective first optical group 31 of zoom system 30 has a converging effect and thus focuses the beam path extending afocally between main objective 21 and the respective first optical group 31 of zoom system 30. An afocal beam path of this kind is often implemented in stereomicroscopes between main objective 21 and the components provided on the image side thereof, resulting in a particularly good adaptation capability for additional components. As explained, however, the invention is also suitable for microscopes not having an afocal beam path.

At least one of optical groups 31 to 33 is respectively embodied axially movably in order to adjust the magnification factor. In the context of this Application, "axial" refers to a direction that proceeds respectively from the focal point of main objective 21 perpendicularly through main objective 21. The axial direction is thus defined by main objective 21. In the example depicted in FIG. 1 it corresponds to that of optical axis 62 of the beam paths of stereo channels L, R on the image side of main objective 21. In the example depicted, for example, the first respective optical group 31 of zoom system 30 can be embodied fixedly, i.e. not axially movably.

Provided respectively on the image side of first optical group 31 of zoom system 30 is a second optical group 32 that has diverging properties. The respective beam path that is focused by first optical group 31, and thus proceeds convergently, is spread out by means of second optical group 32 of zoom system 30. Second optical group 32 is embodied movably, for example, respectively along optical axis 62 (i.e. in an axial direction).

A respective third optical group 33 is provided farther on the image side. This group again has a converging effect and again focuses the beam path diverged by means of second optical group 32 of zoom system 30. Third optical group 33 of zoom system 30 can also be respectively embodied movably along optical axis 62 (i.e. in an axial direction).

In the example depicted, zoom system 30 comprises respective lenses 38, or corresponding optical groups made up of several lenses, as a fourth optical group; these respectively spread out the beam path focused by third optical group 33 of zoom system 30 (and thus proceeding convergently) to the extent that an afocal beam path is also present on the image side of zoom system 30.

An adjustable aperture diaphragm 41 is provided respectively between second optical group 32 and third optical group 33 of zoom system 30. Aperture diaphragms 41 in stereo channels L, R can be arranged in an, in particular controllably embodied, diaphragm unit 40 that comprises one or more mechanical and/or electronic inputs 42 through which a diaphragm signal can be received. The diaphragm signal can be used to adjust a diaphragm diameter of adjustable aperture diaphragms 41. A corresponding signal 41 can be outputted in particular by an image capture unit 50 that will be explained in detail below, or by a control computer 80 that applies control to image capture unit 50 and/or to the entire microscope system via communication channels 81.

As mentioned, however, the diaphragm openings in both stereo channels L, R can also be defined and can have different diameters.

In the example depicted, aperture diaphragms 41 of left L and right R stereo channel are set differently, so that a viewer who looks with his or her eyes 97 through eyepieces 96 (see below) into the stereomicroscope that is depicted can, as a result of the physiological phenomenon explained earlier, perceive an image having improved resolution and depth of field.

Depicted on the image side of zoom system 30 is a outcoupling unit 70 that couples out a preferably adjustable portion 63 of the light of the two stereo channels L, R to an image capture unit 50. Let it be emphasized that a corresponding outcoupling unit does not need to be arranged in the position depicted. An outcoupling unit 70 can also be integrated, for example, into a tube 90 (see below). Instead of that portion 63 of the light of the two stereo channels L, R which is intended for image capture unit 50, the light intended for presentation to a viewer can also be outcoupled from the axial direction, i.e. with respect to optical axes 62. In the latter case, portion 63 intended for image capture unit 50 can extend farther in an axial direction. In all cases, a respective deflection can also occur. A microscope configured exclusively for digital image capture can also be embodied without an outcoupling unit 70, so that the light of the two stereo channels L, R can be made available entirely to image capture unit 50.

In the example depicted, the outcoupled portion 63 of the light of the two stereo channels L, R that is intended for image capture unit 50 is coupled out at an angle of 90° with respect to optical axes 62. Semi-transparent mirrors or prisms 71 can be provided for this purpose, for example, in both stereo channels L, R. Optionally, only light of one stereo channel L, R can also be outcoupled by means of one semi-transparent mirror 71 or prism. The outcoupled portion 63 of the two stereo channels L, R can be coupled out in separate channels (not depicted), so that an image capture unit 50 can obtain a respective stereoscopic partial image, for example, by means of two image capture modules 52 (see below; e.g. CCD chips). Two image capture units 50 can also be used here.

The outcoupled portion 63 of the light of the two stereo channels L, R can also be transferred into a common beam path, such that, for example, the light of one of stereoscopic channels L, R can be respectively blocked out in the context of image capture by means of image capture unit 50. An optical unit 73 that comprises, for example, alternatingly actuatable shutters 74 can be provided, for example, for this purpose. Image capture unit 50 can thereby alternatingly capture both stereo channels L, R. Alternatively or in addition to shutters 74, differently oriented polarizing filters can also be provided, for example, in optical unit 73, said filters enabling a subsequent selective capture of light of the two stereoscopic channels L, R by means of image capture unit 50 but not interfering with visual observation. These can be equipped for this purpose, for example, with a variably adjustable polarizing filter 51. Optical unit 73 is also usefully controllable by image capture unit 50 and/or by control computer 80 via one or more mechanical and/or electronic inputs 75.

Let it be emphasized that the depiction here is highly schematic. If the arrangement depicted were implemented directly, a problem might occur in stereo mode, i.e. when both shutters 74 are opened. The right semi-transparent mirror or the corresponding prism 71 would then necessarily (although not desirably) also direct the light of left channel L partly upward in right channel R, which would disrupt stereo viewing. For such an instance, the semi-transparent mirrors or prisms 71 would be oriented so that they reflect light out of the plane of the paper (i.e. no penetration of the stereo channels occurs). The outcoupled channels can then be overlaid outside the paper plane by means of a further beam splitter, and coupled into the digital image capture unit.

By way of a deflection mirror 72 or a corresponding prism, the outcoupled portion 63 of the light of one or both stereo channels L, R is irradiated into the (repeatedly mentioned) image capture unit 50, optionally filtered by means of polarizing filter 51, and focused by a corresponding optical group 53 onto an image capture module 52. As mentioned, two or more image capture modules 52 can also be provided. If, for example, polarizing filters 74 are provided in optical unit 73, each of the two or more image capture modules 52 can comprise a complementary filter, so that light of only one stereo channel is selectively captured in each case. With a corresponding orientation of image capture unit 50 it is also possible to omit deflection mirror 72 or a corresponding prism.

Outcoupling unit 70 is followed by a viewing unit that, for example, encompasses a tube 90. Zoom system 30, outcoupling unit 70, and the viewing unit can be arranged in part in a housing onto which main objective 21, or a corresponding objective mount, can be threaded and/or attached, for example, by means of a dovetail receptacle. The viewing unit, in particular tube 90, can likewise be attached with a corresponding receptacle onto a corresponding housing. Outcoupling unit 70 as well can be of modular configuration.

Tube 90 encompasses respective tube lenses 91 that generate intermediate images 95. Tube lenses 91 are followed by respective erecting systems 92 for image erection. Respective eyepieces 96 follow on the image side. Tube lenses 91 are embodied to focus respective parallel light bundles onto a point 94 in the plane of intermediate images 95. Point 94 is located at the front focal point of eyepieces 96 and is imaged at infinity so that it can be viewed with eyes 97 of a viewer.

A corresponding stereomicroscope can be embodied for exclusively digital optical capture of an object 11; the aforementioned capture unit 50 can also be arranged on the image side of tube 90. Erecting systems 92 for image erection are not necessary for digital optical capture.

Further assemblies can optionally be introduced in known fashion into the beam path, for example auxiliary lenses, filters, polarizers, incident illumination units, and/or beam splitter systems.

Stereoscopic channels L and R are arranged here parallel to center axis M. Distance B between the optical axes of stereoscopic channels L and R is referred to as a "stereo base." Stereo base B defines the angle W at which each stereoscopic channel looks at the object. A diameter of a ray bundle is labeled 39. It depends on the respective position of aperture diaphragms 41.

The invention is not limited either to stereomicroscopes having differently embodied stereo channels L, R or ones set to different numerical apertures by means of aperture diaphragms 41, or in general to stereomicroscopes. The invention can, in particular, also be used in single-channel microscopes, as illustrated with reference to FIG. 2. A "single-channel" microscope comprises a single beam path through central objective 21 and, if present, a zoom system 30 having optical units 31 to 33 and 38 present only singly. Single-channel microscopes are, for example, macroscopes and wide field microscopes (epi microscopes), which can likewise profit from the invention. The term "single-channel" of course does not exclude binocular or multi-channel tubes or viewing systems.

Figure 2:
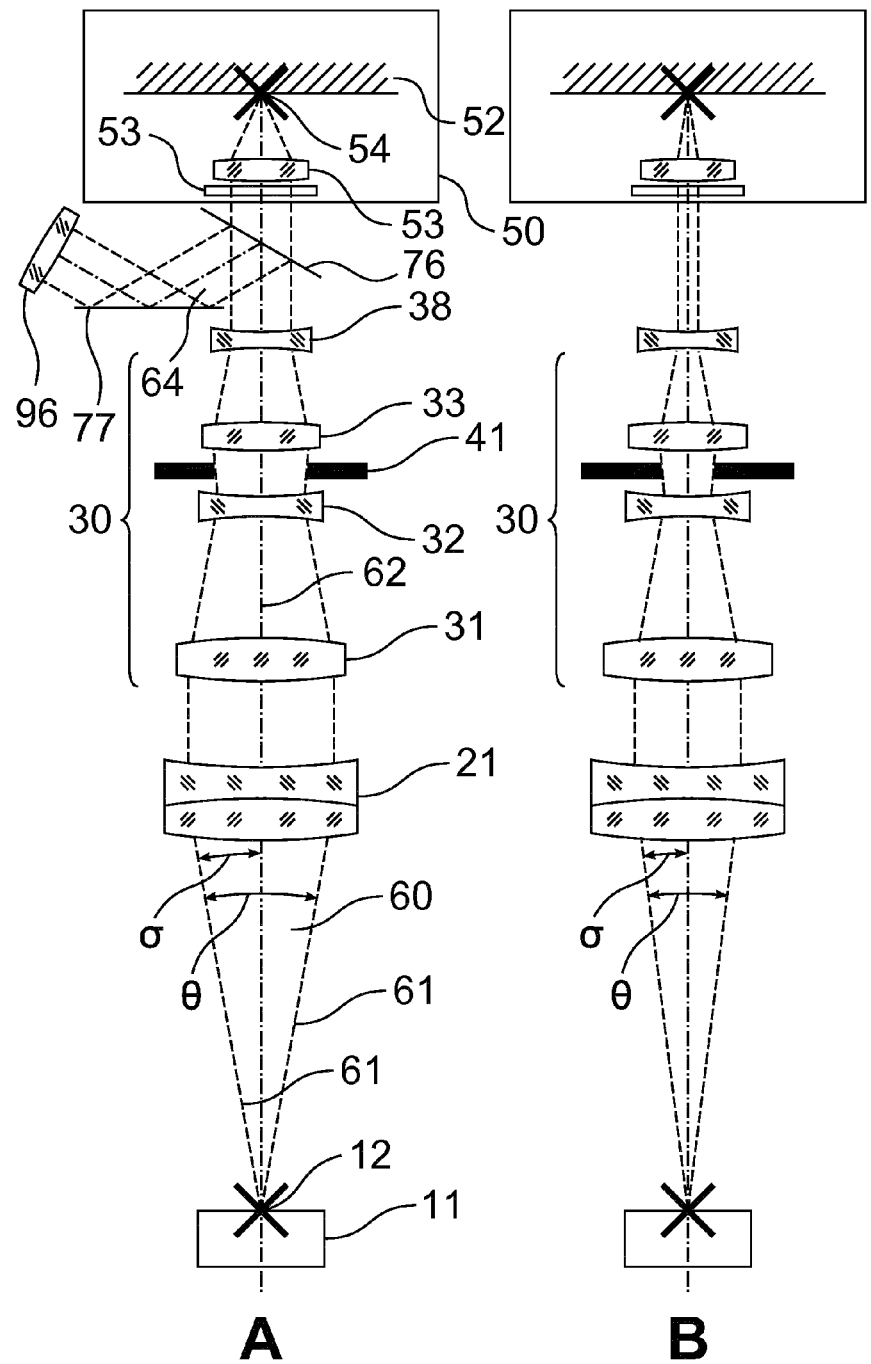
FIG. 2 is a schematic sketch of a beam path of an optical channel of a microscope in which image capture in accordance with an embodiment of the invention can be performed.

FIG. 2 schematically shows a beam path of an optical channel of a microscope that can be embodied and/or operated according to the present invention, at two diaphragm settings A and B. The optical channel can be, for example, one of the optical channels of a stereomicroscope or the beam path of a single-channel microscope indicated above, for example of a macroscope. A corresponding beam path is provided in a stereomicroscope at least partly in pairs (see FIG. 1).

Thanks to the aperture setting by means of aperture diaphragm 41, the optical marginal rays enclose different angles θ in the diaphragm positions labeled as A and B. The angle θ/2 corresponds to the aperture angle σ between one of the respective marginal rays and optical axis 62.

The beam path encompasses main objective 21 (usually referred to in a conventional microscope or macroscope simply as an "objective"), as explained previously. An object 11 to be viewed is arranged in an object plane 12 of main objective 21 which corresponds to its front focal plane. A point being viewed is labeled with an X. Following main objective 21 is a zoom system 30 having three optical groups 31 to 33, as also explained.

Here as well, the beam path proceeds afocally between lens or optical group 38 and an optical group 53 of image capture unit 50, but there is no outcoupling of the portion of the light that is intended for image capture unit 50. Instead, as illustrated only in view A, a corresponding outcoupling of a portion 64 for visual viewing by means of eyepiece 96 can occur. Mirror surfaces or prism surfaces 76, 77 can be provided, for example, for this purpose. The depiction is highly simplified; in particular, depiction of an image erection unit 92 has been omitted.

In the present example, diaphragm positions A and B correspond to the steps of a method according to the present invention. A first digital image capture operation by means of image capture unit 50 occurs at a first point in time (corresponding to diaphragm position A, i.e. at a higher numerical aperture but with less depth of field); a second occurs at a second point in time (corresponding to diaphragm position B, i.e. at a lower numerical aperture but with greater depth of field).

Figure 3:
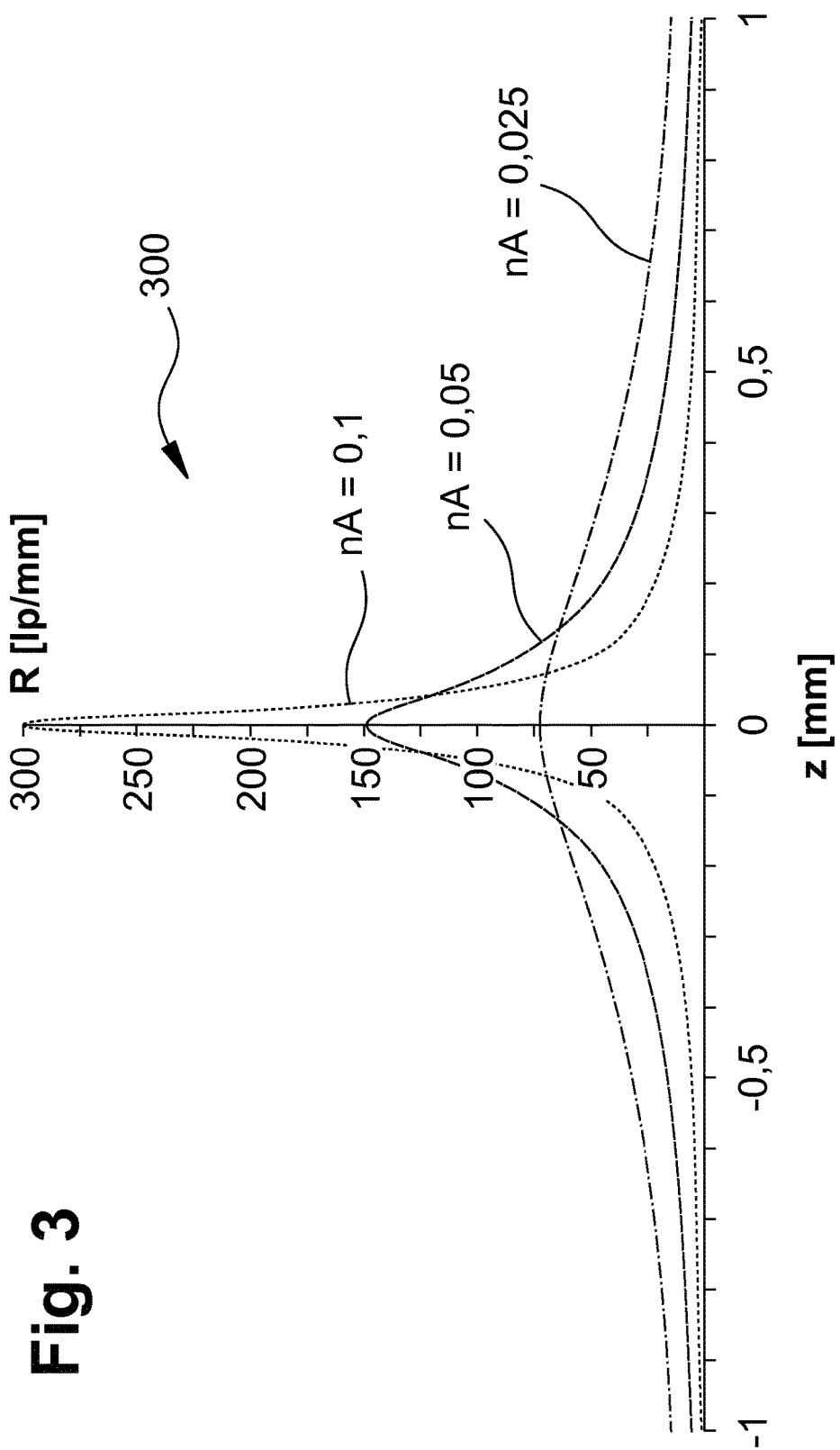
FIG. 3 shows, in the form of a diagram, a correlation between resolution, numerical aperture, and depth of field.

FIG. 3 illustrates a correlation between resolution, numerical aperture, and depth of field in the form of a diagram 300. In diagram 300, a distance z (in mm) from the plane of focus of an objective, e.g. of main objective 21, is plotted on the abscissa, and a resolution R (in line pairs per millimeter) is depicted on the ordinate. For a value z=1 mm a point is located 1 mm above the plane of focus; for a value of −1 mm it is located 1 mm below the plane of focus.

Resolution curves for numerical apertures (nA) of 0.1, 0.05, and 0.025, which are typical, for example, for stereomicroscopes, are depicted by way of example. As already mentioned previously, at high numerical aperture the resolution reaches a maximum, here 300 line pairs per millimeter at a numerical aperture nA of 0.1. This maximum resolution decreases rapidly, however, with increasing distance from the zero plane (the plane of focus). At a distance of only 0.1 mm the resolution is already only about a sixth. This corresponds to the small depth of field, explained above, at high numerical aperture.

The depth of field can be significantly improved if the numerical aperture is decreased, for example with an adjustable aperture diaphragm 41. The aperture diaphragm is correspondingly closed for this purpose. As is evident, what results, for example, with a numerical aperture of 0.05 is only half the maximum resolution as compared with the numerical aperture of 0.1; but at a z value of 0.1 mm, i.e. outside the plane of focus, it is even better than with a numerical aperture of 0.1. This is true to a greater extent with a further decrease in numerical aperture, for example to 0.025.

Figure 4:
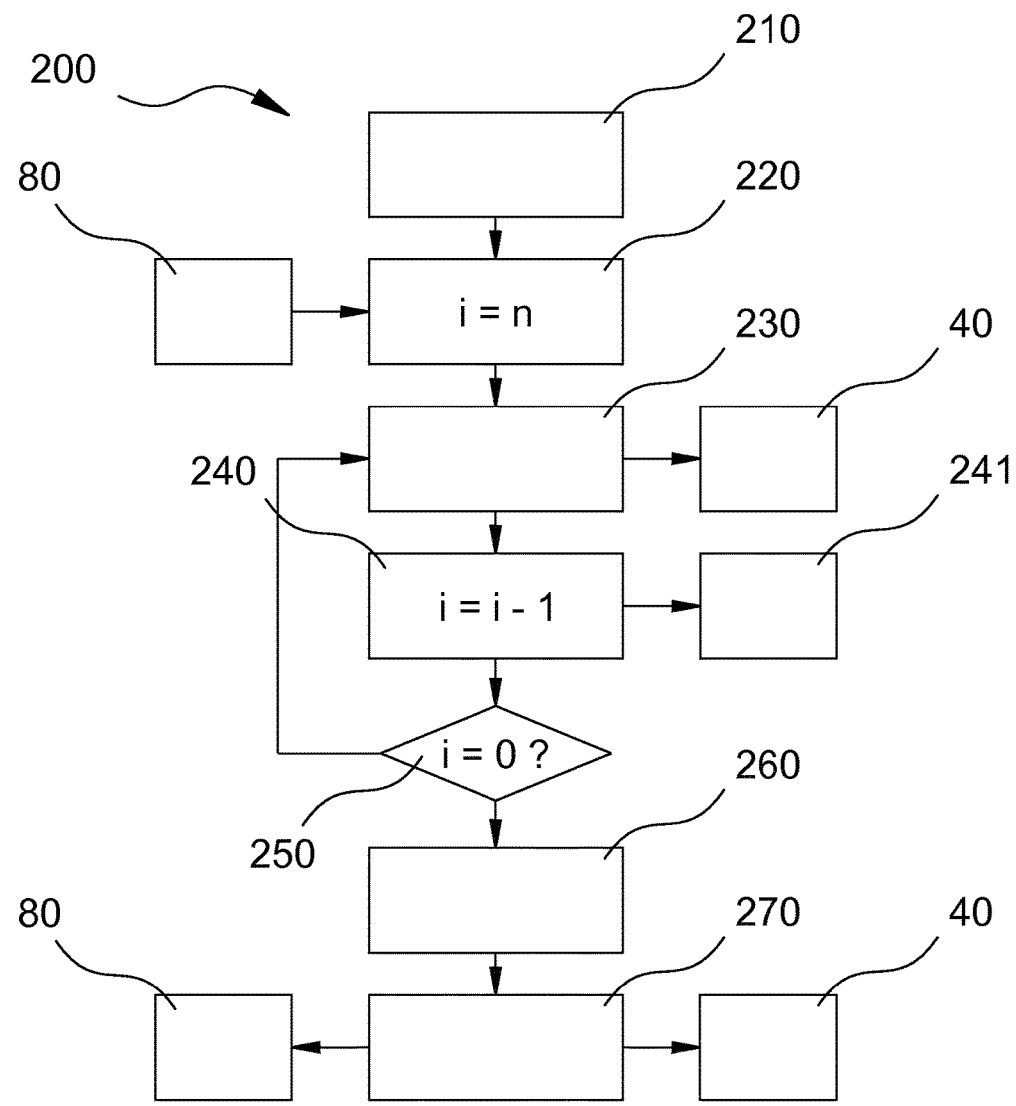
FIG. 4 shows, in the form of a schematic flow chart, a method in accordance with an embodiment of the invention.

The present invention thus strives for image capture in which, ideally, the resolution corresponds to an envelope of the resolution curves shown. This can be achieved, for example, by means of method 200 illustrated in FIG. 4. FIG. 4 schematically depicts, in the form of a flow chart, a method in accordance with an embodiment of the invention.

The method begins with a method step 210. In a step 210, for example, a microscope system configured for a corresponding method transitions into an image capture mode. In a step 220, a number of images to be captured is specified, for example by means of a control computer 80 and/or by means of a calculation unit or the like integrated into image capture unit 50. The number is referred to here as "n" and is temporarily stored in a counter i. The number n can be specified, for example, on the basis of the magnification that is set and/or based on microscope parameters. At the same time, in step 220 a specification for a diaphragm adjustment (in the form of an adjusting step), and/or with reference to an exposure time and/or a gain, is specified. This specification as well can be accomplished on the basis of currently set microscope parameters, such as a magnification or the like.

In a step 230, an adjustment of the aperture diaphragm in accordance with the specified adjustment step is accomplished by output of a corresponding signal to a diaphragm unit 40. In the embodiment depicted, the method therefore relates to a microscope system having a corresponding controllable diaphragm. In a subsequent step 240, the counter i is decremented by one. At the same time, an image is acquired by means of image capture unit and is temporarily stored in a buffer memory 241. As already explained previously, image acquisitions from, for example, two stereoscopic channels of a stereomicroscope can also occur in this context, and in particular can also follow one another. For example, firstly one stereoscopic channel can be blocked out and an image can be acquired. Selection of another stereoscopic channel, and a corresponding image acquisition, then follow. Corresponding stereo image pairs can likewise be temporarily stored in buffer memory 241. If the specified number of images has not yet been reached, which is ascertained by a comparison in step 250, then in step 230 another diaphragm adjustment is accomplished in the manner explained, followed by an image acquisition with decrementing of counter i.

Once the specified number of images has been acquired, they are correlated with one another in a step 260 that can also be performed in an external control computer 80. A method cycle ends in a step 270 by the fact that, if this has not yet occurred, correspondingly correlated images can be outputted to an external control computer 80 or also to an external image reproduction unit. At the same time, diaphragm unit 40 is shifted into its baseline state. The method can begin again with step 210.

Figure 5:
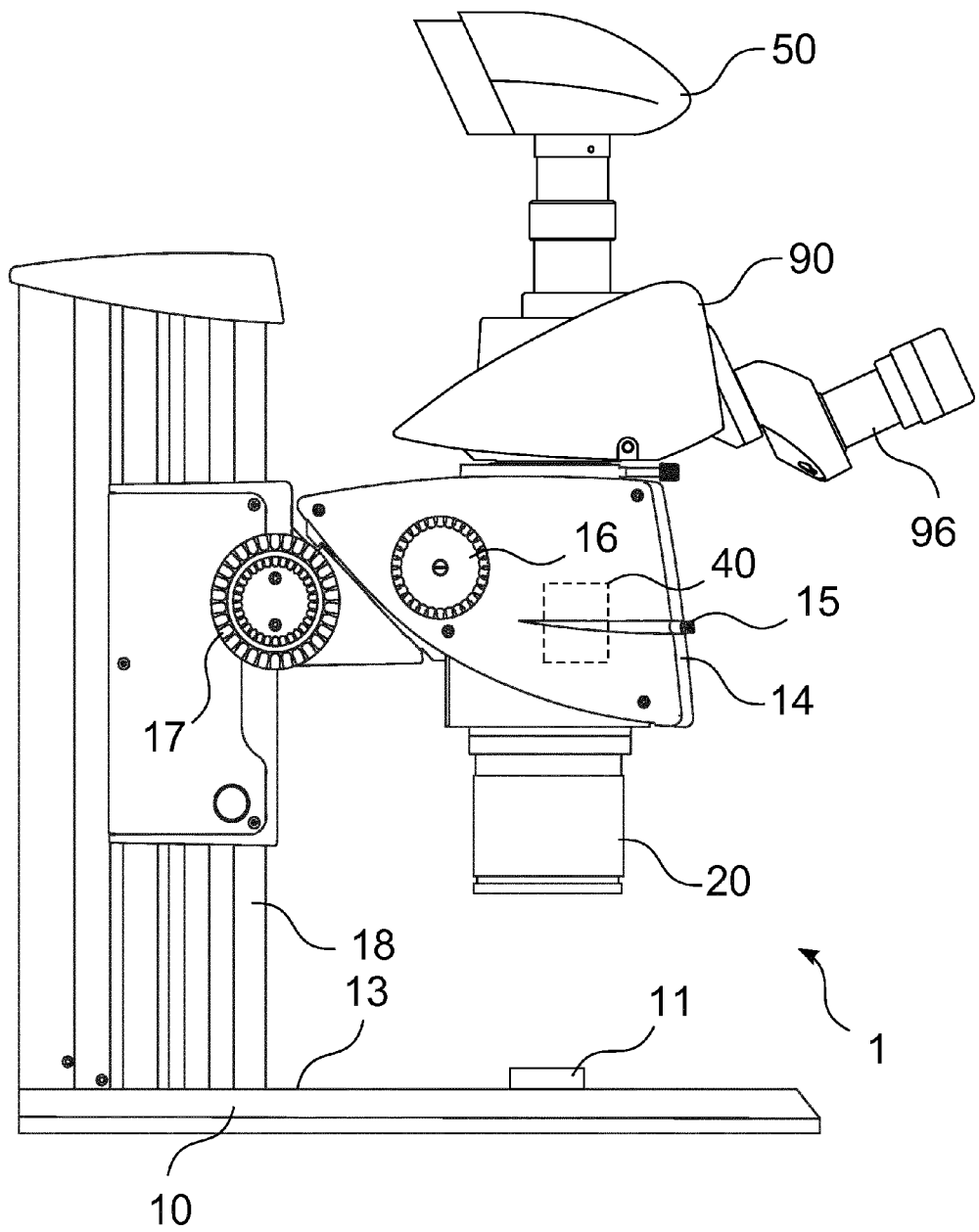
FIG. 5 schematically shows a stereomicroscope in which image capture in accordance with an embodiment of the invention can be performed.

FIG. 5 illustrates practical implementation of the actions according to the present invention in a microscope system embodied as a stereomicroscope. The microscope system is labeled 1 in its entirety.

Microscope system 1 encompasses a specimen stage 10 on whose surface 13 an object 11 is arranged. An objective mount 20 for main objective 21 is provided. Zoom systems 30 are arranged in a housing 14 that can possess corresponding adjusting means 15, for example for adjusting filters and the like. An adjusting unit 16 is provided for zoom adjustment of zoom systems 30. Adjusting unit 16 adjusts at least one movable optical group of zoom systems 30. An adjusting unit 17 is provided for focus adjustment. By means of adjusting device 17, the stereomicroscope is adjustable as to its height on a stand 18. Following housing 14 on the image side is tube 90, into which eyepieces 96 can be fitted. A digital image capture unit 50, for example a CCD camera, can be arranged in a beam path that can be outcoupled, for example, using tube 90.

Diaphragm unit 40 is arranged entirely within housing 70, which does not change its external dimensions. As explained, control can be applied to it by means of control signals of digital image capture unit 50. Microscope system 1 is configured to carry out the method explained above.

What is claimed is:

1. A method (200) for furnishing a digital resulting image using a microscope system (1) that comprises means (R, L, 41) for furnishing microscopic images at different numerical apertures as well as a digital image capture unit (50), wherein the method comprises:

capturing by means of the digital image capture unit (50), in the form of digital individual images, at least two microscopic images at different numerical apertures, the at least two microscopic images having different depths of field; and comparing respective mutually corresponding image regions of the digital individual images to one another in terms of their image sharpness, the image regions of the digital individual images having the greatest image sharpness being in each case combined to yield the digital resulting image.

2. The method (200) according to claim 1, wherein the comparison of the different image regions of the digital individual images is accomplished in terms of their image sharpness, using at least one value characterizing the image sharpness.

3. The method (200) according to claim 1, wherein the mutually corresponding image regions of the digital individual images are defined on the basis of a specified location in the at least two digital individual images.

4. The method (200) according to claim 3, wherein the specified location is defined in the form of identical image coordinates and/or identical pixel regions in the at least two digital individual images.

5. The method (200) according to claim 1, wherein the mutually corresponding image regions of the digital individual images are ascertained on the basis of an image content detection operation.

6. The method (200) according to claim 1, further comprising adjusting at least one aperture diaphragm (41) in at least one optical channel (L, R) of the microscope system (1) in order to furnish the at least two microscopic individual images at the different numerical apertures.

7. The method (200) according to claim 1, further comprising furnishing and capturing the at least two microscopic individual images at the different numerical apertures simultaneously by means of two optical channels (L, R) each having a fixed numerical aperture.

8. The method (200) according to claim 1, wherein the method is repeated for at least two different focus settings of a main objective (21) of the microscope system (1) so that one resulting image is obtained for each of the at least two different focus settings.

9. A microscope system (1) that comprises means (R, L, 41) for furnishing microscopic images at different numerical apertures as well as a digital image capture unit (50), and is configured to carry out a method (200) as recited in claim 1.

10. The microscope system (1) according to claim 9, wherein the means (L, R, 41) for furnishing the microscopic images at the different numerical apertures includes at least one optical channel (L, R) having an aperture diaphragm (41) having an adjustable diaphragm opening.

11. The microscope system (1) according to claim 9, wherein the means (L, R) for furnishing the microscopic images at the different numerical apertures includes two optical channels (L, R) having different and/or adjustable numerical apertures.

12. The microscope system (1) according to claim 10, further comprising a control device (80) in order to apply control to the digital image capture unit (50) in such a way that the digital image capture unit (50) captures at least two digital individual images at different diaphragm openings of the aperture diaphragm (41) in the at least one optical channel (L, R).

13. The microscope system (1) according to claim 12, the control device (80) being embodied to respectively specify a number of digital individual images to be captured and an adjustment magnitude for the aperture diaphragm (41) in the at least one optical channel (L, R), and to alternatingly carry out a capture of the digital individual images by means of the digital image capture device (50) and an adjustment of the aperture diaphragm (41) by an amount equal to the adjustment magnitude.

14. The microscope system (1) according to claim 9, wherein the microscope system (1) is embodied as a stereomicroscope having two stereoscopic channels (L, R), one capture module (52) of the digital image capture unit (50) being associated with each of the stereoscopic channels.

* * * * *